United States Patent
Andjelic et al.

(10) Patent No.: US 11,028,222 B2
(45) Date of Patent: Jun. 8, 2021

(54) ADVANCED PROCESSING OF ABSORBABLE POLY(P-DIOXANONE) CONTAINING HIGH LEVEL OF P-DIOXANONE MONOMER

(71) Applicant: Ethicon, Inc., Somerville, NJ (US)

(72) Inventors: Sasa Andjelic, Nanuet, NY (US); Brian M. Kelly, Ringoes, NJ (US); Marc Wisnudel, Millburn, NJ (US)

(73) Assignee: Ethicon, Inc., Somerville, NJ (US)

( * ) Notice: Subject to any disclaimer, the term of this patent is extended or adjusted under 35 U.S.C. 154(b) by 0 days.

(21) Appl. No.: 16/202,454

(22) Filed: Nov. 28, 2018

(65) Prior Publication Data

US 2020/0165380 A1    May 28, 2020

(51) Int. Cl.
| | |
|---|---|
| C08G 63/08 | (2006.01) |
| C08G 63/89 | (2006.01) |
| C08G 63/90 | (2006.01) |
| C08L 67/04 | (2006.01) |
| C08G 63/66 | (2006.01) |
| C08G 63/78 | (2006.01) |
| C08G 63/85 | (2006.01) |
| C08J 3/12 | (2006.01) |
| C08K 5/18 | (2006.01) |
| C08G 63/664 | (2006.01) |

(52) U.S. Cl.
CPC ........... *C08G 63/66* (2013.01); *C08G 63/785* (2013.01); *C08G 63/85* (2013.01); *C08J 3/12* (2013.01); *C08K 5/18* (2013.01); *C08G 63/08* (2013.01); *C08G 63/664* (2013.01); *C08G 63/89* (2013.01); *C08G 63/90* (2013.01); *C08L 67/04* (2013.01)

(58) Field of Classification Search
None
See application file for complete search history.

(56) References Cited

U.S. PATENT DOCUMENTS

| | | | |
|---|---|---|---|
| 4,052,988 A | 10/1977 | Doddi et al. | |
| 5,403,347 A | 4/1995 | Roby et al. | |
| 5,652,331 A * | 7/1997 | Forschner | C08G 63/664 |
| | | | 525/411 |
| 5,717,059 A | 2/1998 | Forschner et al. | |
| 5,844,067 A * | 12/1998 | Erneta | C08G 63/08 |
| | | | 528/354 |
| 6,448,367 B1 | 9/2002 | Akieda et al. | |

(Continued)

*Primary Examiner* — Richard A Huhn
(74) *Attorney, Agent, or Firm* — David R. Crichton

(57) ABSTRACT

The present invention is directed methods of making absorbable poly(p-dioxanone) pellets by melt polymerization of p-dioxanone conducted in a single reactor with a temperature regulator by charging a melt reactor with a mixture of p-dioxanone (PDO) monomer, initiator, catalyst, and optionally a dye; melt polymerizing the mixture in the melt reactor with sufficient agitation of the mixture to allow complete mixing of the monomer and for sufficient time to form a PDO polymer product having an unreacted PDO monomer content of at least 65 mole percent; placing the PDO polymer product under a vacuum to remove at least portion of unreacted PDO; discharging the PDO polymer product from the melt reactor directly into an in-line, underwater pelletizer to produce undried PDO pellets, collecting the undried PDO pellets, and storing the collected PDO pellets in the freezer or a vacuum chamber prior to drying.

13 Claims, 3 Drawing Sheets

Schematic view of a new poly(*p*-dioxanone) synthesis route

(56) References Cited

U.S. PATENT DOCUMENTS

| | | |
|---|---|---|
| 8,236,904 B2 | 8/2012 | Andjelic et al. |
| 8,450,431 B2 | 5/2013 | Andjelic et al. |
| 9,862,826 B2 | 1/2018 | Hillberg et al. |
| 9,873,790 B1 | 1/2018 | Andjelic et al. |

* cited by examiner

Figure 1. Schematic view of a standard poly(*p*-dioxanone) synthesis route
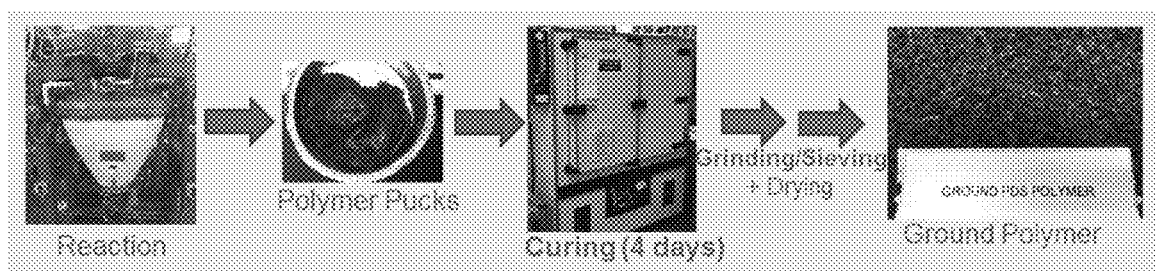
Figure 2. Schematic view of a new poly(*p*-dioxanone) synthesis route
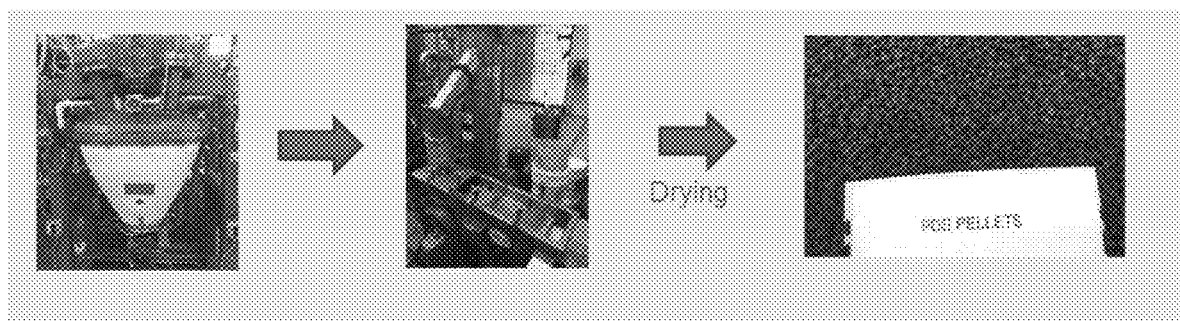

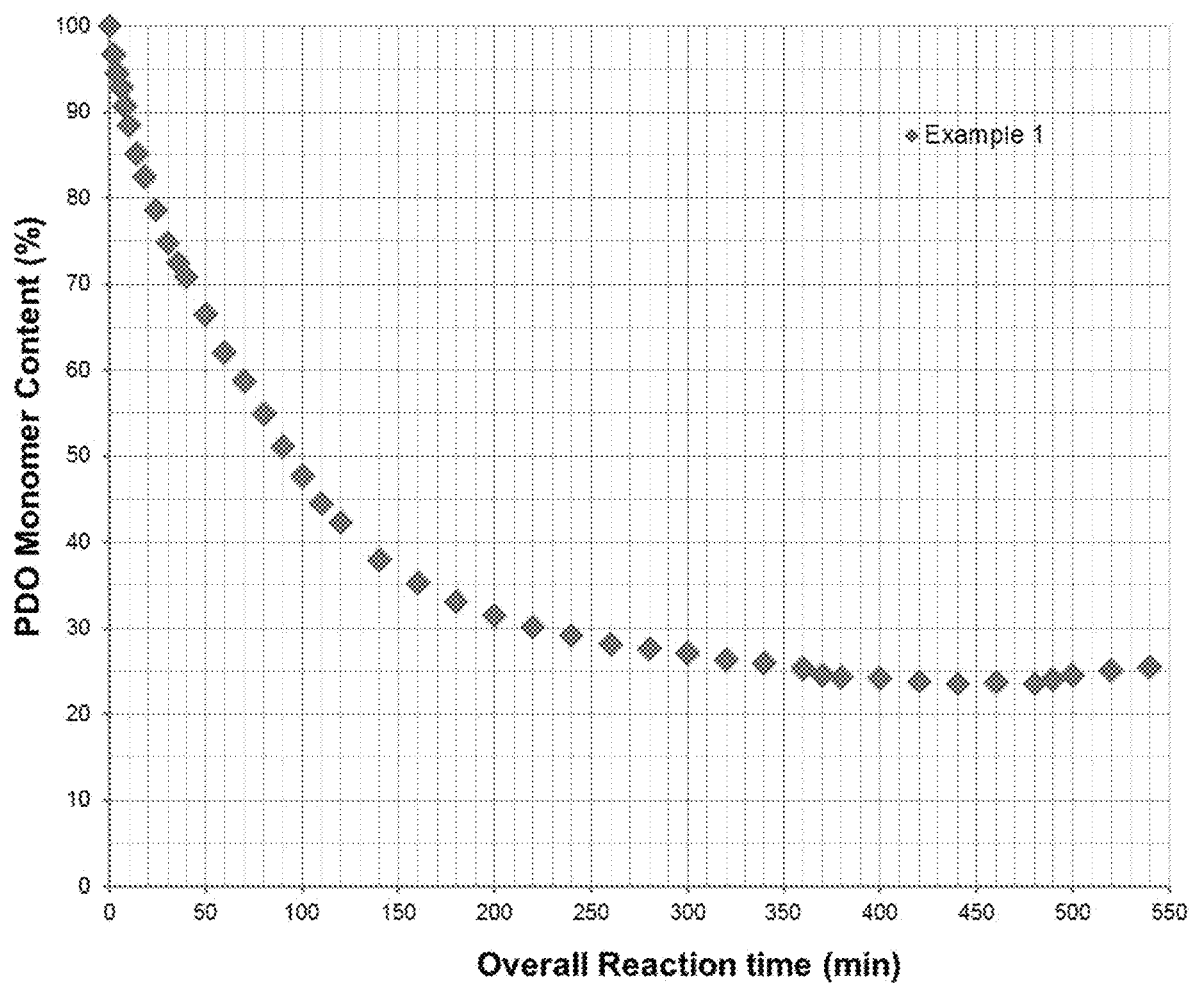
Figure 3 - Reaction Kinetics for Example 1

ADVANCED PROCESSING OF ABSORBABLE POLY(P-DIOXANONE) CONTAINING HIGH LEVEL OF P-DIOXANONE MONOMER

FIELD OF THE INVENTION

This invention describes novel methods in processing melt polymerized poly(p-dioxanone) resin containing high monomer levels, such as from 15-35 mole %. These methods may include a use of underwater pelletization during melt polymerization of p-dioxanone, followed by selected drying steps to threat such formed pellets.

BACKGROUND OF THE INVENTION

Problems to be Solved

Discharging a low glass transition temperature polymer from a reactor with high level of residual monomer via pelletization process represents an enormous technical challenge. This challenge is present because such fully amorphous resins are likely to be too soft prior to pelletization, having high concentration of liquid monomer residuals. The second big hurdle is that majority of such polymers, for instance a poly(p-dioxanone) resin loaded with high monomer content is moisture sensitive, causing a significant degradation that can occur prior and during the drying procedure (removal of monomer by a heating step under vacuum).

The homopolymer and copolymers of p-dioxanone are attracting increased interest in the medical device and pharmaceutical fields because of their low toxicity, softness, and flexibility. Poly(p-dioxanone) (PDS) was first suggested as an absorbable polymer by Doddi et al. [U.S. Pat. No. 4,052,988A "Synthetic absorbable surgical devices of poly-dioxanone" by Namassivaya Doddi; Charles C. Versfelt, and David Wasserman (Ethicon, Inc.)]. By the early 1980s, the homopolymer was used to form of a monofilament surgical suture. Since then, many p-dioxanone copolymers have been described [Bezwada, R. S.; Jamiolkowski, D. D.; Cooper, K. In Handbook of Biodegradable Polymers; Domb, A. J.; Kost, J.; Wiseman, D. M., Eds.; Harwood Academic: Singapore, 1997; Chapter 2.]. Monofilaments based on a copolymer with trimethylene carbonate, glycolide, and p-dioxanone monomer have been cleared by the U.S. Food and Drug Administration and are presently offered for sale [U.S. Pat. No. 5,403,347 Roby, M.; Bennett, S. L.; Liu, C. K. (United States Surgical Corp.)].

PDS, with its low glass-transition temperature ($Tg=-10°$ C.), is inherently soft and flexible. The low value of Tg also allows this crystallizable material to exhibit these properties at room temperature. Thus, besides being well suited for surgical monofilaments, it can be injection-molded into a number of non-filamentous surgical devices such as clips (ABSOLOK™ and LAPRA-TY™), and fasteners (Mitek Meniscal Repair System). These surgical articles take full advantage of the general toughness exhibited by this family.

A standard procedure of polymerizing p-dioxanone involves an initial short liquid (melt) phase in a reactor, followed by an extended solid phase in a curing oven typically set at the temperatures between 65° C. to 85° C. [see U.S. Pat. Nos. 4,052,988, 5,717,059, and 6,448,367B1]. For instance, U.S. Pat. No. 4,052,988 "Synthetic absorbable surgical devices of poly-dioxanone" by Namassivaya Doddi; Charles C. Versfelt, and David Wasserman (Ethicon, Inc.) described the synthesis of absorbable poly-dioxanone homopolymers starting in melt, and finishes utilizing solid state curing step at 80° C. The resin is used in subsequent fiber production for use as surgical sutures. The use of solid state stage is because formed poly(p-dioxanone) is in thermodynamic equilibrium with its p-dioxanone monomer, causing the shift of monomer regeneration at higher reaction temperature. Lowering the reaction temperature to the range between 65° C. and 85° C., the resin solidifies or crystallizes, which helps to advance the polymerization (monomer conversion). However, due to diffusional difficulties in the solid state, the reaction kinetics are very slow and require several days to achieve high conversion. Oven cured poly(p-dioxanone) typically has about 5-15 mole % of unreacted p-dioxanone monomer before a drying step.

U.S. Pat. No. 5,717,059 (Shell Oil Company, Houston Tex.) describes the method for preparing poly(p-dioxanone) by first, producing a reaction product mixture of molten poly(p-dioxanone) and unreacted p-dioxanone, and then solidifying that mixture into a plurality of solid particles. The particles are then transferred into a separator vessel, where under reduced pressure and temperature are swept by an inert gas. This procedure separates the polymer from monomer, which is being recycled in a continues process. The inventors also pointed out the problems of monomer removal directly from the poly(p-dioxanone) by applying 2.5-hour vacuum to remove unreacted monomer. The weight average molecular weight of the polymer after monomer removal dropped dramatically by 41% of the molecular weight of the polymer prior to vacuum stage. This was explained by a shift in chemical equilibrium as the monomer was removed from the polymer/monomer mixture.

U.S. Pat. No. 5,652,331 ("Method for preparing poly(p-dioxanone) polymer" Shell Oil Company, Houston Tex.) tried to address the problem of monomer removal in the poly(p-dioxanone) melt by adding to product mixture a cyclic anhydride to form end-capped poly(p-dioxanone). The reaction continues by applying the vacuum while exposing the mixture to temperature range of about 50 to about 150° C. The final step involves recovering the end-capped poly(p-dioxanone). The inventors provided data indicated difficulties of removing unreacted monomer from the melt because of the tendency of the polymer to degrade significantly, or the loss of molecular weight as the monomer is removed. However, inducing the chemical reaction of poly(p-dioxanone) with cyclic anhydride, the formed product withstands chemical degradation after the monomer removal.

Finally, melt processing of polymers, including underwater pelletization is described in multiple studies [U.S. Pat. No. 5,844,067A ("A process for producing absorbable segmented copolymers of aliphatic polyesters with a uniform sequence distribution"), U.S. Pat. No. 9,873,790B1 ("An absorbable semi-crystalline polymer blend composition"), U.S. Pat. No. 9,862,826B2 ("Halogen-free polymer blend" describing melt pelletization of polyether block amide)]. However, none of these references describe the use of underwater pelletization on slow-crystallizing, absorbable polymers having glass transition below 20° C., particularly underwater pelletization of poly(p-dioxanone) that is additionally moisture sensitive and prone to fast degradation.

SUMMARY OF THE INVENTION

The present invention addresses many of the problems and shortcomings noted above for the manufacture of poly(p-dioxanone).

Solutions to the Problems

Several innovative steps are introduced during melt polymerization of poly(p-dioxanone) that allows successful pelletization of the resin with as high as 35 mole % of residual monomer. These include, optimal time and temperature profile for reactor-only PDO polymerization, a vacuum stage prior to an underwater pelletization, and the use of improved processing conditions during the pelletization. In addition, a novel drying procedure has been proposed to limit degradation of the moisture-sensitive undried poly(p-dioxanone) pellets.

The present invention is directed methods of making absorbable poly(p-dioxanone) pellets by melt polymerization of p-dioxanone conducted in a single reactor with a temperature regulator by charging a melt reactor with a mixture of p-dioxanone (PDO) monomer, initiator, catalyst, and optionally a dye; melt polymerizing the mixture in the melt reactor with sufficient agitation of the mixture to allow complete mixing of the monomer and for sufficient time to form a PDO polymer product having an unreacted PDO monomer content of at least 65 mole percent; placing the PDO polymer product under a vacuum to remove at least portion of unreacted PDO; discharging the PDO polymer product from the melt reactor directly into an in-line, underwater pelletizer to produce undried PDO pellets, collecting the undried PDO pellets, and storing the collected PDO pellets in the freezer or a vacuum chamber prior to drying.

The melt polymerization of PDO monomer can be conducted in a single reactor in the presence of a monofunctional initiator at an initiator concentration of between 500:1 to 2,000:1 (mole of monomer:mole of initiator), and in the presence of a catalyst in the total amount of 30,000:1 to 300,000:1 (moles of monomer:moles of catalyst), for total reaction time of between 4 hours and 16 hours. The monofunctional initiator can be dodecanol. The catalyst can be stannous octoate. The dye, when present, can be D&C Violet Number 2 in a dye concentration of between 0.01 and 0.2 weight percentage.

The unreacted PDO monomer content of an intermediate product can be between about 15 mole percent to about 35 mole percent. The pelletization step can be conducted by the underwater pelletizer wherein the melt reactor operates at a temperature of from 95° C. to 130° C.; the melt rector agitator operates at a rotational speed of between 2 RPM to 6 RPM or from about 20-40% of the rotational speed of the preceding step. The pump speed in the pelletizer can operate at about 5 RPM to about 7 RPM, and then gradually increased to the range between 10 RPM and 15 RPM. The pelletizer can operate at a die temperature of about 100° C. to 140° C. The cutter can operate at a rotational speed of between about 2,000 and 3,600 RPM.

The methods described above can further include the step of drying the poly(p-dioxanone) pellets. The poly(p-dioxanone) pellets can be dried using a fluidized bed drying apparatus. Alternatively, the drying can be conducted using tumble dryers, equipped with vacuum and/or heating capabilities, including the steps of: transferring undried poly(p-dioxanone) pellets having an unreacted p-dioxanone monomer content of between about 15 mole percent to about 35 mole percent into a tumble drier; applying a vacuum in the tumble drier at room temperature and reducing the moisture level in poly(p-dioxanone) pellets to less than 100 parts per million, as measured by a moisture analyzer; setting the drier temperature to a starting drying temperature of about 55° C. and maintaining the heat and vacuum for about two to six hours; setting the drier temperature to an intermediate drying temperature of about 75° C. and maintaining the heat and vacuum for about two to six hours; setting the drier temperature to a final drying temperature from about 85° C. to 95° C. and maintaining the heat and vacuum for about 16 to 32 hours; and collecting the dried poly(p-dioxanone) pellets.

The dried poly(p-dioxanone) pellets can contain less than 4% of unreacted PDO monomer at the end of drying process, and/or have an inherent viscosity (IV) as measured in hexafluoroisopropanol at 25° C. and at a concentration of 0.10 g/dL of greater than 1.2 dl/g, and/or a weight average molecular weight (Mw) greater than 50,000 Daltons, as measured by gel permeation chromatography, and/or a crystallinity level greater than 45% as measured by Wide Angle X-ray Diffraction (WAXD) after being subjected to a heat treatment between about 60° C. and 90° C. for at least six hours.

BRIEF DESCRIPTION OF THE DRAWINGS

FIG. 1 is a schematic of the prior art poly(p-dioxanone) synthesis route.

FIG. 2 is a schematic of the improved poly(p-dioxanone) synthesis route.

FIG. 3 illustrates the reaction kinetics from Example 1.

DETAILED DESCRIPTION OF INVENTION

Figure 4:
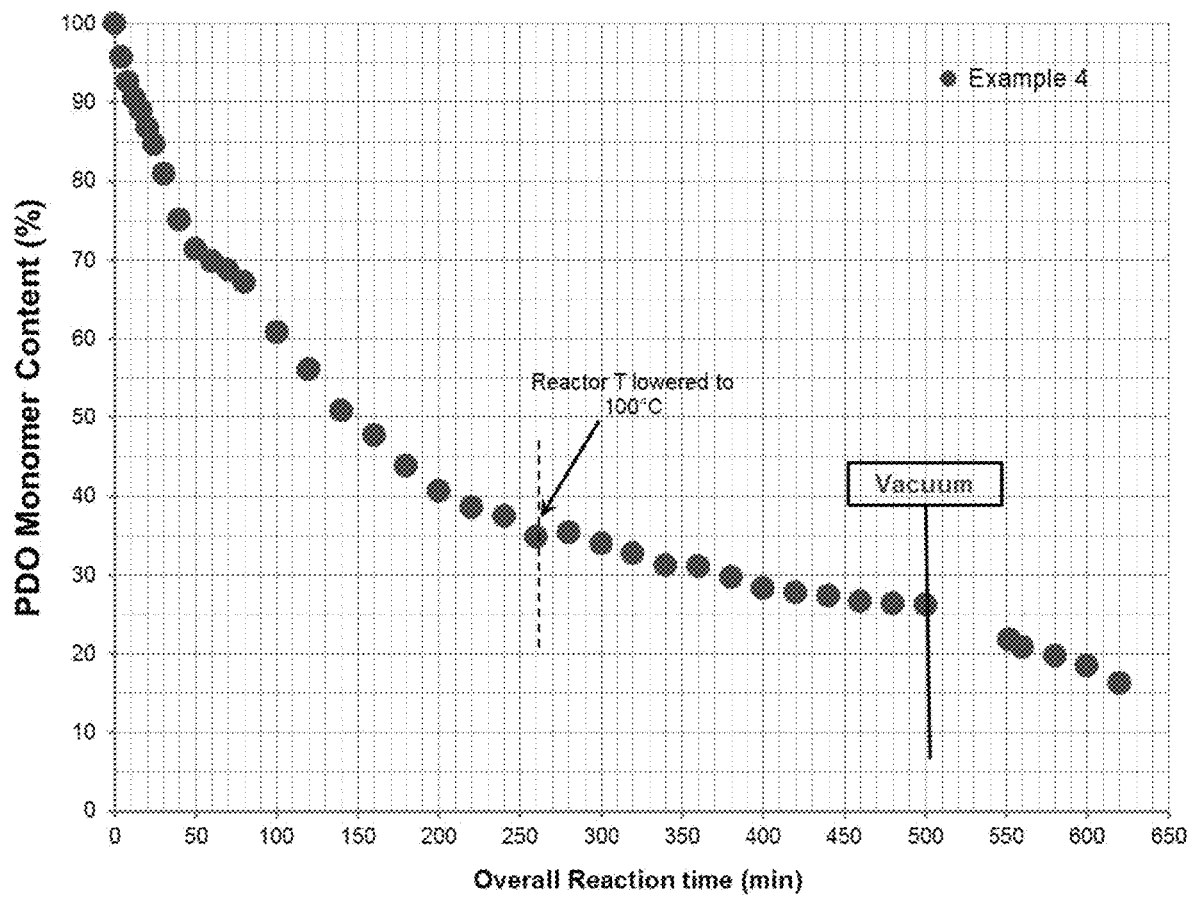
FIG. 4 illustrates the reaction kinetics from Example 4.

In this section, we will describe inherent difficulties of p-dioxanone (PDO) polymerization by melt synthesis. During melt polymerization of PDO, the polymer yield is very low due to thermodynamic equilibrium of polymer and monomer, which favors the monomer generation at higher processing temperature. Because of this, a standard procedure of making poly(p-dioxanone) resin includes a very short reactor melt synthesis step, followed by extended solid state polymerization at low temperature (typically around 80° C.) in a curing oven. After about 4-5 days of solid state polymerization, the solidified/crystallized poly(p-dioxanone) packs are ground and sieved prior to the final drying step (monomer removal by vacuum and heat).

Potential disadvantages of the existing methods for solid-state polymerization are very long cycle time, questionable sample uniformity of cured solid-state packs due to diffusion difficulties, and a presence of fines as a byproduct of a grinding operations. Fines may negatively affect extrusion process, since they melt much earlier than the rest of larger particles.

The present invention describes the novel methods of producing poly(p-dioxanone) resin, or other absorbable polymers having glass transition temperature below 20° C. that contain high monomer content, preferably in the range from about 15 mole % to about 35 mole %. The melt polymerization is carried out entirely in a single reactor, followed by underwater palletization. Applicants unexpectedly discovered that such soft polymer resins with high liquid content can be successfully pelletized using a specific set of processing conditions described in this invention. In addition, Applicants discovered that the resulting undried pellets containing between about 15 mole % to about 35 mole % unreacted PDO monomer are extremely sensitive to the moisture in an air, causing the pellets/resin to degrade (loose molecular weight) in an accelerated pace. Therefore, several new steps prior and during the drying stage are essential to limit the molecular weight loss of pelletized polymers.

The inventive methods described herein of melt polymerizing p-dioxanone, followed by one-step discharge via underwater pelletization provide following important benefits:

1. Reduction of the cycle time for a minimum of 96 hours, by eliminating oven curing and grinding/sieving operations;
2. Production of chemically and morphologically uniform resin particles, i.e. pellets, allows higher lot-to-lot consistency;
3. Elimination of fines and resulting production of particles/pellets with the same form and size; this improves robustness of the extrusion process with more consistent diameter;
4. Reduction of catalyst requirements; lower catalyst may aid in resin's stability during melt processing; and
5. Reduction in the cost of production.

The melt blend can be prepared in stainless steel reactor, which is customarily equipped with an oil jacket and blades for agitation. PDO monomer is added along with an initiator and catalyst, and optionally a colorant, such as a dye. After the initial charge of the reactants and further components, a vacuum/nitrogen purging cycle is initiated with agitation by upward blade rotation direction. The vacuum/nitrogen purging cycle consists of an evacuation to pressures less than 200 mTorr followed by the introduction of nitrogen gas. The v/n cycle is repeated once again to ensure a dry atmosphere. At the end of the final nitrogen purge, the pressure is adjusted to be slightly above one atmosphere and the oil temperature controller is set to a desired reaction temperature, preferably about 140° C., while the rotational speed of the agitator is maintained at the same rotational speed and in an upward direction for the reminder of the run. The reaction can proceed at the set temperature for upwards of about 6 hours, followed by 2 hours at 150° C., and finished with 1 hour at 100° C. before discharge. In a preferred cycle, a total of 9 hours of polymerization is performed as outlined above.

In another embodiment, a jacketed twin cone reactor (CV) can be used that had intersecting dual helical-conical blades that intermesh throughout the conical envelope of the bowl. A CV reactor is a low speed, medium shear style rector with excellent mix dispersement characteristics. High viscosity polymerization and condensation reactions are routinely accomplished in helicone mixers.

The resulting polymer melt blend is purged through an extruder until the feed is consistent, at which point vacuum is applied to wo vacuum ports. The polymer blend extrudate strands are fed through a water bath and into the strand pelletizer. The pelletizer cut the strands into appropriate sized pellets. This process continues until the entire polymer melt blend is formed into substantially uniform pellets.

In a preferred process, a Reduction Engineering Model 604 unit is utilized as the strand pelletizer. The molten polymer or bimodal polymer blends are forced out of a ZSK-30 extruder by pressure through a multi-hole die and passed through two water baths (troughs) in a row, filled either with cold or hot water (20 to 70° C.). The strands are then fed into the strand pelletizer, which pulls the strands at a given speed based on desired size. The strand pelletizer has several rotating blades travelling the same speed as the puller motor. In a "good" case, the strands remain uniform in size throughout the process, from the die through the water troughs and into the pelletizer, generating at the end uniform pellets.

For poly(p-dioxanone) strand-pelletization, the extruder zone temperatures for the preferred process are set between 140 and 160° C. throughout all five zones (gradual increase in temperature towards the end zone), having rotator speeds varying between 175 and 225 RPM, while the batch temperature is maintained at between 165 and 175° C., and torque values between 45 and 55 Nm. Water trough temperatures are maintained at 78° F.

Preferred drying equipment can be conventional vacuum tumble drier or a conventional fluidized bed drier, each operated within specified parameters. Undried pellets made in accordance with the processes described above contain a high level of unreacted monomer and are very hydroscopic (absorbing potentially high level of moisture from the air). If the moisture in pellets is not removed prior to the heat treatment of undried pellets in a dryer, degradation of the material can occur. For this reason, it is recommended to pull vacuum at room temperature on undried samples at the start of drying cycle for about 8-12 hours.

The moisture analysis data are summarized in the table below for undried pellets made in accordance with the inventive process. It was found that the moisture level of the resulting pellets increased from the time of polymer discharge (450-500 ppm) to the moment the prepared pellets were ready to enter the dryer's cycle (1,524 ppm, at relative humidity (RH) in the room of about 30%).

TABLE

Moisture Data for Undried Pellets of Example 1 during the Vacuum Stage as a Function of Drying Time at Room Temperature

| Vacuum time (h) | Water (ppm) | Room RH (%) during the run | Comments |
| --- | --- | --- | --- |
| 0 | 1,524 | 31 | Pellets appeared sticky after the test |
| 20 | 496 | 32 | Pellets slightly sticky |
| 28 | 76 | 29 | Non-sticky pellets |
| 48 | 26 | 41 | Non-sticky pellets |

The data shows that more than 24 hours of vacuum at ambient temperature to reduce moisture level in pellets below 100 ppm, which is considered low enough to proceed with the next drying cycle step. So, instead of standard 8-12 hours of vacuum time that has been used conventionally for absorbable polymers, including poly(p-dioxanone) ground resin, at least 28-hour vacuum cycle should be used, preferably from 28 to 48-hour vacuum cycle for poly(p-dioxanone) undried pellets. This modified vacuum cycle produces pellets with less sticking, as well as reducing polymer degradation.

Different characterization methods, described below, were used to measure key properties of the poly(p-dioxanone) resins and its fibers to support this application. Calorimetric data were generated on a TA Instruments' Differential Scanning Calorimeter, DSC Model 2910 MDSC, using dry $N_2$ as a purge gas. Typically, about 5-10 mg of a polymer resin or a fiber was placed in an aluminum pan, secured by a lid (cover), and positioned in the autosampler holder area of the instrument. Two types of non-isothermal conditions are employed: a) First heat scan: a polymer or a fiber was quenched to −80° C., followed by the constant heating rate at 10° C./min up to 140° C.; and b) Second heat scan: after melting of a sample at 140° C. for three minutes, a polymer or a fiber was quenched below its glass transition temperature (−80° C.), followed by the controlled heating step with the constant rate of 10° C./min. The first heat scan data are indicative of "as is" properties of a sample and, as such, largely dependent on its thermal history. The second heat data, on the other hand, are independent of thermal history of the sample and are a function of the inherent properties of the sample (chemistry, molecular weight, monomer level, etc.). From the first heat scan data, in addition to the glass transition temperature and melting point, the heat of fusion, ΔHm, as an area under the melting peak and expressed typically in J/g, can be obtained. Heat of fusion is directly proportional to the level of crystallinity in a sample.

Morphological data were obtained by conventional Wide Angle X-Ray Diffraction (WAXD) analysis. The WAXD measurements of a dried resin or a fiber were carried out on a Siemens Hi-Star™ unit using CuKα radiation at a wavelength of 1.542 Å. The instrument was operated at 40 kV and 40 mA with a collimator diameter of 0.5 mm. The convolution of the X-ray images and the calculation of crystallinity content were conducted using the DIFFRAC PLUS™ software developed by Siemens.

Inherent viscosity (IV) measurements were conducted in hexafluoroisopropanol (HFIP) at 25° C. and at a concentration of 0.10 g/dL. The molecular weight measurements were performed using Gel Permeation Chromatography (GPC) equipped with Wyatt's Optilab rEx refractometer and Wyatt's HELEOS II multi-angle laser light scattering detector. During the measurements, PL HFIP gel columns were maintained at 40° C., with a mobile phase consisting of HFIP with 0.01M LiBr (0.2% $H_2O$) operating at the flow rate of 0.7 ml/min. Empower and Astra software were used for data analysis. Two PL HFIP gel columns were also operated at 40° C., and HFIP with 0.01 M LiBr (0.2% H2O) as a mobile phase. Flow rate was 0.7 mL/min with injection volume of 70 μL. Solution concentration was approximately 2 mg/mL.

The Nuclear Magnetic Resonance (NMR) method identifies and determines the chemical composition of polymer resins and fibers using proton nuclear magnetic resonance ($^1$HNMR) spectroscopy. The instrument used was the 400 MHz (9.4 Tesla) Varian Unity INOVA NMR Spectrometer; an appropriate deuterated solvent, such as Hexafluoroacetone sesquideuterate (HFAD) of at least 99.5% purity D (ETHICON ID #2881, CAS 10057-27-9) was used. Sample preparation: In triplicate, 6-10 mg of each sample was weighted and placed into separate 5 mm NMR tubes. Under nitrogen gas in a glove box, 300+/−10 μL of HFAD was added using 1000 μL syringe, to each NMR tube and cap. Meanwhile, a solvent blank was prepared. The samples were then removed from the nitrogen glove bag/box and NMR tube(s) were placed in a sonic bath, and sonicated until the sample was dissolved, and no evidence of solid polymer existed. Subjecting the samples again under the nitrogen flow, 300+/−10 μL benzene-d6 was added using a 1000 μL syringe to each NMR tube and capped. The tubes were shake well to ensure uniform mixing of the HFAD and benzene-d6 solvents.

Mechanical properties of the fibers (monofilaments) before and after post-processing, including hydrolysis treatment, such as straight tensile and knot tensile strength (one simple knot in the middle) were measured by the Instron tester. The Instron model was ID # TJ-41, equipped with 100-lb load cell LC-147 with pneumatic grips at clamping pressure around 60 psi. For the regular tensile measurements of non-hydrolyzed (time zero) samples, steel faces were used on the Instron machine. The gage length was 5 inches; a sampling rate of 20 pts/secs with a crosshead speed of 12 in/min was employed. The full-scale load range was 100 lbf. For hydrolysis testing (Breaking Strength Retention, BSR measurements), rubber faces were used to avoid slippage. The fiber diameters were measured using Federal gauge (Products Corp. Providence, R.I.) model #57B-1, identification # W-10761.

To follow conversion of a p-dioxanone monomer in real polymerization time, a FT-NIR spectrometer [Antaris II Fourier Transform Near Infrared Spectrometer, supplied by ThermoFischer Scientific] equipped with a ¼" diameter transmission probe and 2-meter optical cable was used. TQ Analyst Software was used to analyze real-time NIR spectra. The overall scanning (collection) time was set to 64 scans, with 8 $cm^{-1}$ spectral resolution. Exactly every two minutes the spectra were collected as a function of reaction time. The area under the carbonyl peak (the first harmonic overtone of a combination band), located at about 4,620 $cm^{-1}$ was used to monitor p-dioxanone conversion. An NIR transmission probe (supplied by Axiom) was placed in the lower part of the vessel, at the same level/height where a thermocouple measuring the batch temperature sits.

The water content in poly(p-dioxanone) pellets were obtained using Computrac Vapor Pro Moisture Analyzer (Arizona Instruments LLC, Ariz.). The instrument utilizes a cylinder-shaped bottle heater, a dry air—carrier gas flow system and a moisture sensor. The instrument heats the sample (recommended 10° C. below its glass transition temperature) contained in a 25 ml septum vial. Volatiles driven from the sample are carried by the air system through the Sensor Block containing a Relative Humidity (RH) sensor. The reading from this sensor is combined with the sensor block temperature and carrier gas flow rate in a microprocessor to generate a measurement of the moisture content in the sample. A typical procedure for measuring the water level in pellets follows. After performing a dryness test and calibrating the RH sensor, about 1 g of pellets (accurately measured by an analytical balance) is placed into a glass septum vial. The sample in the vial is then inserted in the instrument, which is preheated at 90° C. and the measurements of released water is begun. At the end of the run the following parameters are displayed on the screen: the water level in parts per million (ppm), total amount of water released in micrograms, and exposure time in minutes. Typically, the test lasts from about 5 to 10 minutes, depending on the sample weight: larger samples take longer time for all the water to be released form a sample.

The following examples are illustrative of the principles and practice of the present invention, although not limited thereto. Numerous additional embodiments within the scope and spirit of the invention will become apparent to those skilled in the art once having the benefit of this disclosure.

Reference Example

As shown below, poly(p-dioxanone) polymer prepared by standard synthetic procedures as described in U.S. Pat. Nos. 4,052,988, 5,717,059, and 6,448,367B1 cannot be pelletized by a strand-pelletization procedure. In addition, bimodal polymer blends of poly(p-dioxanone) described in U.S. Pat. Nos. 8,236,904B2, and 8,450,431B1 despite having enhanced crystallization properties and low level of residual monomer, fail to pelletize using a standard, strand-pelletization technique.

Due to the "soft" nature of poly(p-dioxanone) and inability of the polymer to crystallize fast enough in the water troughs, the resin stuck to the die, making it very difficult to maintain uniform strand diameter, with many breaks occurring at the die. Even when part of the strands made it to the pelletizer, the strands were difficult to cut because of the "soft" poly(p-dioxanone), and the resulting pellets (if any) were not of the desired length or shape. Due to these difficulties, the process of pelletizing poly(p-dioxanone) and bimodal polymer blends of poly(p-dioxanone) was aborted.

Example 1. Inventive Large-Scale Synthesis Conditions of Melt Polymerized p-Dioxanone, PDO This example describes the synthesis of a melt polymerized poly(p-dioxanone), and a subsequent underwater pelletization of high monomer content resin (34 mole %) produced in the larger-scale 15-gallon Benco-style reactor. Throughout the polymerization, monomer conversion was monitored in real-time by remote FT-NIR spectroscopy (Antaris II, Thermo) using a ¼" NIR transmission probe (supplied by Axiom).

Using a large-scale 15-gallon stainless steel Benco reactor equipped with an oil jacket and agitation, 65,000 grams of p-dioxanone monomer were added along with 98.87 grams of dodecanol (DD) initiator, 43.13 ml of a 0.33M solution of stannous octoate catalyst in toluene, and 65 grams of D&C Violet Number 2 dye (0.1 wt. %). After the initial charge, a vacuum/nitrogen purging cycle with agitation at a rotational speed of 10 RPM in an upward direction for 25 minutes was initiated. The reactor was evacuated to pressures less than 200 mTorr followed by the introduction of nitrogen gas. The cycle was repeated once again to ensure a dry atmosphere. At the end of the final nitrogen purge, the pressure was adjusted to be slightly above one atmosphere and the oil temperature controller was set to 140° C., while the rotational speed of the agitator was maintained at 10 RPM in an upward direction for the reminder of the run. The reaction proceeded at 140° C. for 6 hours, followed by 2 hours at 150° C., and finishing with 1 hour at 100° C. before discharge. A total of 9 hours of polymerization was performed.

During the polymerization at selected time intervals, a small amount of sample was removed from the reactor, and sent to analytical testing, including DCS, NMR, GPC, and IV measurements. An additional information was obtained using a FT-NIR spectrometer by following conversion of p-dioxanone, PDO monomer in real polymerization time. Due to the thermodynamic equilibrium nature between PDO and its polymer, the achievable monomer conversion in these types of melt polymerization is rather low; consequently, a discharged resin contained a lot of unreacted monomer.

The polymerization rate, as evidenced by the slope of the line in FIG. 3, was relatively fast at the beginning of the reaction, but slowed considerably in later stages of the reaction. From about 300 minutes of reaction, the monomer conversion seemed to level off at about 25 mole % monomer content. Longer reaction time under these polymerization conditions does not seem to benefit polymer properties.

Reference Example 2. Underwater Pelletization of Poly(p-Dioxanone)

Poly(p-dioxanone) polymer produced by the melt reactor-only process of Example 1 failed to produce pellets by using selected set of pelletizing conditions, known to work previously with other absorbable polyesters.

At the end of the final reaction period of the Example 1, the agitator speed was reduced to 4.0 RPM in the downward direction, and the polymer was attempted to discharge using the Gala underwater pelletizing apparatus. The die hole size was 0.093" with 4 holes opened. The die temperature was set at 95° C., with the pump and cutter speed of 12 RPM, and 3,600 RPM, respectively. The melt temperature was 109° C., and water temperature flow kept at 40° C. Except for temperature profiles of a die and melt, these are the standard conditions used for underwater pelletization of other absorbable polymers including polyglycolide homopolymer and at least some lactide and glycolide copolymers.

Using these conditions, pelletization failed because the polymer was not able to cut, wrapping around a die fixture. The resin appeared too soft.

Example 2. Underwater Pelletization of Poly(p-Dioxanone)

At the end of the final reaction period of the Example 1, the agitator speed was reduced to 4 RPM in the downward direction, and the polymer was discharged using the Gala underwater pelletizing apparatus. The pelletizer material output was about 64.8 kgs/hr, yielding a net weight of 60.3 kg. Upon cooling, uniform oval-shaped pellets were placed in the freezer for storage until drying. The pellets were then placed into a 3-cubic foot Patterson-Kelley tumble dryer to help remove residual monomer. Compared to the failed underwater pelletization process of Reference Example 2, several important changes were made. These are displayed in Table 1.

TABLE 1

Gala Pelletizer Conditions used to Process the Polymer of Example 2

| Example # | Pump RPM | Set Die T (° C.) | Cutter RPM | Melt T (° C.) | Set Water T (° C.) | # of holes opened | Die hole size (in) |
|---|---|---|---|---|---|---|---|
| Ref 2 | 12 | 95 | 3,600 | 109 | 40 | 4 | 0.093 |
| Ex. 2 | 6 to 13 | 115 | 3,415 | 126 | 15 | 2 | 0.093 |

Instead of starting the pump at a rotational speed (RPM) directly to 12, the process was initiated with a rotation speed of 6 RPM, and then gradually increased to 11 or 13 RPM, depending on a desired pellet size. Also, the die temperature was set to a higher temperature (115° C.), while the water temperature was kept at about 22° C. (set at 15° C., but unable to maintain that low). The number of holes was reduced to 2, though it is not believed that this change affects the ability of the resin to be pelletized.

Table 2 summarized the major properties of time-series samples as well as those of the discharged pellets of Example 2 at the beginning, at the middle, and at the end of discharge.

TABLE 2

Physical Properties of Polymerized PDO Resin of Example 1 as a Function of Reaction Time

| Sample ID | Mole % PDO (NMR) | Mw (g/mol) | IV (dL/g) | $T_g$ (° C.) | $T_c$ (° C.) | $\Delta H_C$ (J/g) | $T_m$ (° C.) | $\Delta H_m$ (J/g) |
|---|---|---|---|---|---|---|---|---|
| 0 + 4 hrs | 44.4 | 76,700 | 0.65 | −59.4 | 9.9 | 27.7 | 80.6 | 39.9 |
| 0 + 6 hrs | 37.2 | 80,100 | 0.84 | −52.7 | 18.0 | 33.5 | 84.8 | 42.9 |
| 0 + 8 hrs | 35.8 | 74,500 | 0.75 | −48.4 | 22.8 | 33.8 | 86.9 | 43.4 |
| 0 + 9 hrs | 34.7 | 73,200 | 0.83 | −48.8 | 20.2 | 34.3 | 86.6 | 44.5 |
| Start pellets | 34.5 | 74,400 | 0.82 | −47.0 | 23.0 | 33.3 | 87.6 | 43.3 |
| Middle pellets | 34.1 | 74,000 | 0.84 | −45.8 | 23.5 | 34.7 | 88.4 | 43.8 |
| End pellets | 33.2 | 73,900 | 0.81 | −45.7 | 23.7 | 35.9 | 88.5 | 45.9 |

Table 2 indicates that discharged undried pellets contain about 34 mole % of unreacted monomer based on NMR analysis. The data highlights that there is no significant difference in physical properties between pellets at the beginning, at the middle, and at the end of discharge, which suggest high pellet uniformity.

Reference Example 3. Standard Drying Procedures Applied to Undried Pellets

This example illustrates that the standard drying conditions for poly(p-dioxanone) granular resin cannot be used to produce the pellets of the present invention. Undried poly (p-dioxanone) pellets produced using procedures of Example 1 (no vacuum stage used) yielded following physical properties: weight average molecular weight of 80,100 Daltons, an inherent viscosity of 1.33 dL/g, with 28.0 mole % of unreacted PDO monomer left. The undried pellets were kept in a freezer for about a week prior to the drying procedure.

The undried polymer pellets were then placed into a 3-cubic foot Patterson-Kelley, PK tumble dryer to remove residual monomer using a standard drying procedure applied for regular poly(p-dioxanone) ground resin. Once charged with the undried pellets, the Patterson-Kelley tumble dryer equipped with four stainless steel balls was closed, a dryer rotational speed of 3 RPM was initiated, and the pressure was reduced to less than 200 mTorr. These conditions were maintained with no heat for 12 hours. After the 12-hour period, the oil jacket temperature was set to 80° C. and maintained for the next 48 hours while keeping steady rotation and vacuum. However, after about 12 hours at 80° C. soak, the batch had to be aborted due to a strong sticking of pellets to each other and to the dryer's wall.

Alternative drying conditions were tried as follows: 12 hours dwell at room temperature followed by 8 hrs@45° C., 8 hrs@70° C., 48 hrs@80° C., and finishing with 3 hrs@90° C., all vacuum stages. After cooling, the polymer is discharged from the dryer by pressurizing the vessel with nitrogen, opening the discharge valve, and allowing the polymer granules to descend into waiting vessels for long term storage.

It was discovered that these conditions prevented sticking of pellets to the wall and to each other. However, although the dried pellets contained only 1.27 mole % residual monomer, the weight average molecular weight dropped significantly: from 80,100 Daltons to 63,500 Daltons, a decrease more than 20%. The inherent viscosity of the resulting dried pellets increased to 1.64 dL/g, but this is mostly due to 26% monomer removal.

Example 3. Drying Conditions of Pellets Produced in Example 1

The detailed drying procedure follows. Once charged with the poly(p-dioxanone) pellets, the Patterson-Kelley tumble dryer was closed, a dryer rotational speed of 4 RPM was initiated, and the pressure was reduced to less than 200 mTorr. These conditions were maintained with no heat for 48 hours for the undried pellets of Example 2. After the 48-hour period, the oil jacket temperature was set to 55° C. and maintained for 2 hours, followed by 75° C./2 hrs, with the final step at 95° C. for 24 hours. The stepwise heating cycle during drying was found critical to prevent sticking of the pellets as described in the Reference Example 3. At the end of the final heating period, the batch was allowed to cool for a period of 2 hours while maintaining steady rotation and vacuum. After cooling, the polymer was discharged from the dryer by pressurizing the vessel with nitrogen, opening the discharge valve, and allowing the polymer pellets to descend into waiting vessels for a long-term storage.

The dried pellets of Example 1 exhibited an IV of 1.54 dL/g and a Mw of 58,600 Daltons. NMR analysis confirmed that the dried pellets contained only 0.44 mole % of residual monomer. Wide Angle X-Ray Diffraction (WAXD) data on the dried sample revealed 50.2% crystallinity.

Similarly, another set of undried pellets were produced following the polymerization procedure of Example 1, yielding a monomer content of as high as 29 mole %. The weight average molecular weight was 74,100 Daltons, and inherent viscosity 1.44 dL/g. The undried pellets were then subjected to the drying procedure: 32 hours vacuum stage at room temperature, followed by 4 hrs@55° C., 4 hrs@75° C., with the final step of 24 hrs@95° C. Again, the pellets did not experience any sticking issues during any stage of drying. The final properties of the dried pellets also did not show any significant decrease of the molecular weight: calculated IV was 1.82 dL/g and a Mw was 74,800 Daltons. NMR analysis confirmed that the dried pellets contained only 0.73 mole % of residual monomer. Wide Angle X-Ray Diffraction (WAXD) data on the dried sample revealed 50.7% crystallinity.

Example 4. Large-Scale Synthesis Conditions of Melt Polymerized p-Dioxanone

Using a 10-gallon stainless steel oil jacketed CV reactor equipped with corotating agitation, 30,000 grams of PDO monomer was added along with 44.51 ml of monofunctional initiator (dodecanol, DD) and 19.91 ml of a 0.33M solution of stannous octoate in toluene. The dye, D&C Violet Number 2 (24 grams, 0.08 wt. %), was added as well. After the initial charge, a vacuum/nitrogen purging cycle with agitation at a rotational speed of 7.5 RPM in an upward direction was initiated. The reactor was evacuated to a pressure of less than 350 mTorr followed by the introduction of nitrogen gas. The cycle was repeated once again to ensure a dry atmosphere.

At the end of the final nitrogen purge, the pressure was adjusted to be slightly above one atmosphere. The rotational speed of the agitator was kept at 7.5 RPM in an upward direction. The vessel was heated by setting the oil controller at 120° C. When the batch temperature reached 100° C., rotation of the agitator was switched to a downward direction. The reaction continued for 4.0 hours from the time the batch temperature reached 100° C. After four hours at 120° C., the reactor temperature was reduced to 100° C., and kept at that temperature for additional 4.0 hours before vacuum stage. The vacuum stage lasted two hours, followed by the discharge via underwater pelletization. Throughout the polymerization, monomer conversion was monitored in real-time by remote FT-NIR spectroscopy (Antaris II, Thermo) using a ¼" NIR transmission probe (supplied by Axiom).

As in the previous inventive Example 2, at the end of the final reaction period, the agitator speed was reduced to 4 RPM in the downward direction, and the polymer was discharged using the Gala underwater pelletizing apparatus. The die hole size was 0.093" with 2 holes opened. The die temperature was kept between 110 and 130° C., with the pump and cutter speed of 14 RPM, and 3500 RPM, respectively. The pelletizer material output was about 51.0 kgs/hr, yielding a net weight of 19.7 kg. During the 2-hour vacuum stage, about 5.7 kg of PDO monomer was removed. Upon cooling, uniform oval-shaped pellets were placed in the freezer for storage until drying. The pellets were then placed into a 3-cubic foot Patterson-Kelley tumble dryer to help remove residual monomer.

Until up to the vacuum stage, the reaction kinetics of this run is comparable to the previous Example 2, leveling off at about 25 mole %. However, after the introduction of the 2-hour vacuum step, the monomer level dropped significantly and surprisingly to about 10% content. Potential advantages of having poly(p-dioxanone) pellets with less monomer content prior to the drying stage are: potentially less moisture uptake, and thus, less polymer degradation, higher storage stability of undried pellets, less footprint (smaller cold trap needed), and faster drying procedure. Table 3 summarized the major properties of time-series samples as well as those of the discharged pellets at the beginning, at the middle, and at the end of discharge.

TABLE 3

Physical Properties of Polymerized PDO resin of Example 4 as a Function of Reaction Time, including Discharged Undried and Dried Pellets

| | | | | | Second heat DSC data | | | |
|---|---|---|---|---|---|---|---|---|
| Sample ID | Mole % PDO (NMR) | Mw (g/mol) | IV (dL/g) | $T_g$ (° C.) | $T_c$ (° C.) | $\Delta H_c$ (J/g) | Tm (° C.) | $\Delta H_m$ (J/g) |
| 0 + 4 hrs | 50.8 | 82,100 | 0.96 | −63.6 | 5.6 | 24.0 | 78.8 | 34.2 |
| 0 + 8 hrs | 31.1 | 83,900 | 1.39 | −42.9 | 21.6 | 34.5 | 89.9 | 41.7 |
| 0 + 9 hrs V + 1 | 22.3 | 83,200 | 1.52 | −34.0 | 29.8 | 39.6 | 94.3 | 46.1 |
| 0 + 10 hrs V + 2 | 15.1 | 80,000 | 1.67 | −27.1 | 36.3 | 42.8 | 97.8 | 48.2 |
| Start pellets | 16.4 | 80,200 | 1.63 | −25.0 | 37.1 | 42.2 | 98.7 | 47.2 |
| Middle pellets | 16.2 | 80,200 | 1.63 | −26.3 | 35.5 | 42.3 | 97.9 | 48.2 |
| End pellets | 16.8 | 80,900 | 1.63 | −26.8 | 36.8 | 41.1 | 97.7 | 47.3 |
| Dried pellets | 2.03 | 80,500 | 1.95 | −11.7 | 47.9 | 48.5 | 105.5 | 50.9 |

Table 3 indicates that the resin prior to discharge contained 15.1% residual monomer based on NMR analysis (16.1% based on real-time NIR data), and undried pellets contained on average 16.5% of unreacted monomer. No difference in physical properties between pellets at the beginning, at the middle, and at the end of discharge indicates high pellet uniformity. The pellets were dried using the conditions from Example 3, contained 2 mole % residual monomer with weight average molecular weight (GPC) of 80,500 g/mol, and inherent viscosity of 1.95 dL/g.

With reaction progress and subsequent monomer removal, calorimetric properties, as measured by the second heat runs, are strongly affected, as indicated in Table 3. The glass transition temperature increased gradually, as the population of polymer chains increases in the system. Crystallization temperature and crystallinity level rise, as well as melting point and heat of fusion as monomer is being converted into the polymer.

Example 5. Large-Scale Synthesis Conditions of Melt Polymerized p-Dioxanone, PDO Using Reduced Catalyst Concentration During standard, solid state (oven curing) treatment, a higher catalyst concentration is needed to advance the reaction (initiation and chain propagation) due to diffusion difficulties in the solid, crystallized matrix. A lower catalyst concentration can improve resin chemical stability during various processing, such as extrusion, injection molding, sterilization, suture barbing, etc.

Polymerization was carried out in a small 2-gallon reactor having no pelletization capability. Using a 2-gallon stainless steel oil jacketed CV reactor equipped with corotating agitation, 7,000 grams of PDO monomer was added along with 12.98 ml of monofunctional initiator (dodecanol, DD) and 2.6 ml of a 0.33M solution of stannous octoate in toluene. The dye, D&C Violet Number 2 (7 grams, 0.1 wt. %), was added as well. After the initial charge, a vacuum/nitrogen purging cycle with agitation at a rotational speed of 7.5 RPM in an upward direction was initiated. The reactor was evacuated to pressures less than 80 mTorr followed by the introduction of nitrogen gas. The cycle was repeated once again to ensure a dry atmosphere. At the end of the final nitrogen purge, the pressure was adjusted to be slightly above one atmosphere. The rotational speed of the agitator was kept at 7.5 RPM in an upward direction. The vessel was heated by setting the oil controller at 140° C. When the batch temperature reached 100° C., rotation of the agitator was switched to a downward direction. The reaction continued for 6.0 hours from the time the batch temperature reached 100° C. After six hours at 140° C., the reactor temperature was reduced to 100° C., and kept at that temperature for additional 3.0 hours including the last 2-hours under the vacuum. The resin was discharged into aluminum packs, and kept in the freezer prior to grinding and sieving operations. The drying procedure was conducted according to the methods described in the Example 3.

Reaction kinetics was found only slightly slower compared to those of Examples 1 and 4 presented earlier, despite almost only a half catalyst used (monomer:catalyst=80, 000:1 vs. 44,700:1 used in Ex. 1 & 4). The resin prior to discharge contained about 21 mole % residual monomer based on NMR analysis, or 19 mole % calculated by FT-NIR method.

The dried pellets of this example exhibited an IV of 1.96 dL/g and a Mw of 84,100 Daltons. NMR analysis revealed that the resin contained 0.58 mole percent of unreacted monomer. Wide Angle X-Ray Diffraction (WAXD) data on the dried sample revealed 49.3% crystallinity.

Example 6. Large-Scale Synthesis Conditions of Melt Polymerized p-Dioxanone

The resin for this example was produced in the same manner as described in Example 4, except that slightly modified temperature profile is used. After charging the monomer, catalyst, initiator, and a dye, the reactor temperature was set to 120° C., and kept at that temperature for full 8.0 hours, followed by 2-hour vacuum stage at 100° C. The underwater pelletization was conducted at the same manner as in Example 4, yielding about 18.1 kg of nice pellets. The drying was conducted using conditions of Example 3.

The dried pellets of this example exhibited an IV of 2.10 dL/g and a Mw of 90,100 Daltons. NMR analysis revealed that the resin contained 0.67 mole percent of unreacted monomer. Wide Angle X-Ray Diffraction (WAXD) data on the dried sample revealed 53% crystallinity.

Example 7. Post-processing of the Inventive Large-Scale Synthesis Conditions of Melt Polymerized p-Dioxanone The dried pellets of Example 6 were used to produce monofilaments of two USP suture sizes: 2-0 and Size 0. The monofilament procedure details follow. The pellets of Example 6 were extruded using a single-screw Jenkins one inch extruder with a 24:1 barrel length, having 1-22-1 screw design, and equipped with a single grooved feed throat. The die had a diameter of 70 mils; the die temperature was set for both sizes at 115° C. After passing through an air gap of 0.375 inch, an extrudate was quenched in a 22° C. water bath.

After exiting the water bath, the fibers entered an air quench cabinet that was utilized to increase the crystallization level of the undrawn fiber before orientation. An appearance of a well-defined and stable draw point is an insurance that the fiber generated enough crystallinity prior to orientation/stretching. An air quench cabinet was heated at 85° F. with monofilaments underwent either one passage (wrap) or multiple wraps. The difference is in total residence time that non-oriented fibers spent in a cabinet. For instance, to complete a one passage through air cabinet requires 135 seconds, while four wraps require 590 seconds. However, it was observed that the polymer produced in Example 6 crystallize relatively fast, and that there was practically no difference in the final fiber physical properties when subjected to these two residence time conditions. The fiber line was then directed toward a first set of unheated godet rolls at a linear speed of 10 fpm. Between first and second sets of godets an infra-red oven was placed preheated at 128° C. to allow easier and more uniform draw. The monofilaments were then directed toward a second set of unheated godet rolls operating at 54 fpm. The fiber line was then directed through a 6-foot hot air oven at 97° C. to a third set of unheated godet rolls; this set of rolls was operating at 58 fpm. The line was then directed through a second 6-foot hot air oven at 107° C. to a fourth set of unheated godet rolls. This last set of rolls was operating at 44.1 fpm, which is a lower speed than the previous set of godet rollers allowing the fiber to relax for better handling characteristics (24%). The overall draw ratio was 4.41 for size 2-0, and 4.56 for size 0 monofilaments.

These monofilament extrusions went smoothly with no breaks, with very stable draw points, which largely contributed to a uniform fiber diameter, and reliable tensile properties. Prior to sterilization, the fibers were annealed at 85° C. for six hours on straight rack (0% rack relaxation). Selected annealed fiber samples were then subjected to suture packaging steps using relay trays with Monadnock drying paper and 8-ups foil types. These samples were then sent for ethylene oxide (EO) sterilization using nominal "X" cycle. To remove residual EO particles following the EO sterilization, the samples were placed in a hot room preheated at 50° C. for three days.

Tensile properties of unannealed, annealed, and annealed and sterile poly(p-dioxanone) monofilaments produced by the methods of the present invention were evaluated next. They were determined using an Instron testing machine using the procedures described earlier in the text. Selected tensile properties (mean values) are listed In Table 4. Knot tensile measurements were made with a single knot made in the middle of the thread.

TABLE 4

Tensile Properties of Unannealed, Annealed, and Annealed and Sterile 2-0 and size 0 Poly(p-dioxanone) Monofilaments

| Example ID | Diameter (Mils) | Annealing Conditions | Final Draw Ratio | Straight Tensile (Lbs) | Elong. (%) | Knot Tensile (Lbs) | Young's Modulus (Kpsi) |
|---|---|---|---|---|---|---|---|
| Ex. 7 2-0 | 14.32 | None | 4.41x | 11.89 | 51.2 | 7.24 | 116 |
| Ex. 7 2-0-A | 14.04 | 85° C./ 6 hrs | 4.41x | 11.54 | 50.2 | 7.45 | 185 |
| Ex. 7 2-0-AS | 14.09 | 85° C./ 6 hrs + EO sterile | 4.41x | 11.65 | 51.3 | 7.37 | 212 |
| Ex. 7 Size 0 | 18.14 | None | 4.56x | 18.59 | 50.1 | 10.9 | 128 |
| Ex. 7 Size 0-A | 17.91 | 85° C./ 6 hrs | 4.56x | 17.93 | 50.6 | 10.9 | 176 |
| Ex. 7 Size 0-AS | 18.03 | 85° C./ 6 hrs + EO sterile | 4.56x | 18.23 | 53.1 | 12.0 | 205 |

As data from Table 4 indicates, outstanding tensile properties were obtained for poly(p-dioxanone) monofilaments made from the inventive processing steps. After annealing and sterilization steps, most of the properties remain intact, except for the Young's Modulus, which increased. Annealing and EO sterilization due to higher crystallinity level achieved in these samples. Higher crystallinity level (confirmed by WAXD and calorimetric measurements) seems to have slight positive effect on knot strength, but none on the straight tensile strength.

We claim:

1. A method of making absorbable poly(p-dioxanone) pellets by melt polymerization of p-dioxanone conducted in a single reactor with a temperature regulator, and comprising the steps of:
   i. charging a melt reactor with a mixture of p-dioxanone (PDO) monomer, initiator, catalyst, and optionally a dye;
   ii. melt polymerizing the mixture at a reaction temperature of between 95° C. and 145° C. in the melt reactor with sufficient agitation of the mixture to allow complete mixing of the monomer and for sufficient time to form a PDO polymer product having an unreacted PDO monomer content;
   iii. placing the PDO polymer product under a vacuum for about 60 to 180 minutes to remove at least portion of unreacted PDO, as measured by monomer content, wherein the unreacted PDO monomer content after step (iii) is between about 15 mole percent to about 35 mole percent;
   iv. discharging the PDO polymer product from the melt reactor directly into an in-line, underwater pelletizer to produce undried PDO pellets,
   v. collecting the undried PDO pellets, and
   vi. storing the collected PDO pellets in the freezer or a vacuum chamber.

2. A method of claim 1, wherein the melt polymerization of PDO monomer is conducted in a single reactor in the presence of a monofunctional initiator at an initiator concentration of between 500:1 to 2,000:1 (mole of monomer: mole of initiator), and in the presence of a catalyst in the total amount of 30,000:1 to 300,000:1 (moles of monomer: moles of catalyst), for total reaction time of between 4 hours and 16 hours.

3. A method of claim 2, wherein the monofunctional initiator is dodecanol.

4. A method of claim 2, wherein the catalyst is stannous octoate.

5. A method of claim 2, wherein the dye is D&C Violet Number 2 in a dye concentration of between 0.01 and 0.2 weight percentage.

6. A method of claim 1, wherein pelletization is conducted by the underwater pelletizer having a pump and a cutter under following conditions:
   a. Setting the melt reactor to an operating temperature of from 95° C. to 130° C.;
   b. Initially setting the melt rector agitator at a rotational speed of between 2 RPM to 6 RPM or from about 20-40% of the rotational speed for step (ii);
   c. Initially setting the pump speed in the pelletizer at about 5 RPM to about 7 RPM, and gradually increasing the pump speed to the range between 10 RPM and 15 RPM;
   d. Setting the pelletizer to a die temperature of about 100° C. to 140° C.;
   e. Setting the cutter to a rotational speed of between about 2,000 and 3,600 RPM.

7. A method of claim 1 further comprising the step of drying the poly(p-dioxanone) pellets.

8. A method of claim 7 wherein the poly(p-dioxanone) pellets are dried using a fluidized bed drying apparatus.

9. A method of claim 7, wherein the drying is conducted using tumble dryers, equipped with vacuum and/or heating capabilities, including the steps of:
   a. Transferring undried poly(p-dioxanone) pellets having an unreacted p-dioxanone monomer content of between about 15 mole percent to about 35 mole percent into a tumble drier,
   b. applying a vacuum in the tumble drier at room temperature and reducing the moisture level in poly(p-dioxanone) pellets to less than 100 parts per million, as measured by a moisture analyzer;
   c. setting the drier temperature to a starting drying temperature of about 55° C. and maintaining the heat and vacuum for about two to six hours;
   d. setting the drier temperature to an intermediate drying temperature of about 75° C. and maintaining the heat and vacuum for about two to six hours;
   e. setting the drier temperature to a final drying temperature from about 85° C. to 95° C. and maintaining the heat and vacuum for about 16 to 32 hours; and
   f. collecting the dried poly(p-dioxanone) pellets.

10. The method of claim 9, wherein the dried poly(p-dioxanone) pellets contain less than 4 mole % of unreacted PDO monomer at the end of drying process.

11. The method of claim 9, wherein the dried poly(p-dioxanone) pellets have an inherent viscosity (IV) as measured in hexafluoroisopropanol at 25° C. and at a concentration of 0.10 g/dL of greater than 1.2 dl/g.

12. The method of claim 9, wherein the dried poly(p-dioxanone) pellets have a weight average molecular weight (Mw) greater than 50,000 Daltons, as measured by gel permeation chromatography.

13. The method of claim 9, wherein the dried poly(p-dioxanone) pellets have a crystallinity level greater than 45% as measured by Wide Angle X-ray Diffraction (WAXD) after being subjected to a heat treatment between about 60° C. and 90° C. for at least six hours.

* * * * *